US008489753B2

United States Patent
Singh

(10) Patent No.: US 8,489,753 B2
(45) Date of Patent: Jul. 16, 2013

(54) APPARATUS AND COMPUTER-IMPLEMENTED METHOD FOR CONTROLLING MIGRATION OF A VIRTUAL MACHINE

(75) Inventor: Sukhvinder Singh, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 12/554,934

(22) Filed: Sep. 7, 2009

(65) Prior Publication Data

US 2011/0016468 A1    Jan. 20, 2011

(30) Foreign Application Priority Data

Jul. 20, 2009  (IN) .............................. 1712/CHE/2009

(51) Int. Cl.
*G06F 15/16* (2006.01)

(52) U.S. Cl.
USPC ............................ 709/229; 709/223; 709/225

(58) Field of Classification Search
USPC .......................................... 709/229, 223, 225
See application file for complete search history.

(56) References Cited

U.S. PATENT DOCUMENTS

| 8,145,760 | B2 * | 3/2012 | Dinda et al. | 709/226 |
| 2007/0079307 | A1 * | 4/2007 | Dhawan et al. | 718/1 |
| 2007/0288228 | A1 * | 12/2007 | Taillefer et al. | 703/28 |
| 2008/0155537 | A1 * | 6/2008 | Dinda et al. | 718/1 |
| 2009/0290501 | A1 * | 11/2009 | Levy et al. | 370/250 |
| 2009/0307597 | A1 * | 12/2009 | Bakman | 715/736 |
| 2010/0205252 | A1 * | 8/2010 | Dorai et al. | 709/205 |
| 2010/0250744 | A1 * | 9/2010 | Hadad et al. | 709/226 |
| 2011/0153697 | A1 * | 6/2011 | Nickolov et al. | 707/827 |

* cited by examiner

*Primary Examiner* — Firmin Backer
*Assistant Examiner* — Jonathan Bui

(57) ABSTRACT

Migration of a virtual machine from a source host to a destination host is controlled by referring to a graph data structure wherein one or more hosts are associated with at least some of the nodes of the graph data structure, a source node being associated with the source host and a destination node being associated with the destination host, and in which each link of the graph data structure is ascribed at least a permission value associated with the virtual machine, to determine if traversal of a path from the source node to the destination node is permitted by the permission values of the links in the path. Migration of said virtual machine is allowed if traversal from said source node to said destination node along the path is permitted.

13 Claims, 3 Drawing Sheets

APPARATUS AND COMPUTER-IMPLEMENTED METHOD FOR CONTROLLING MIGRATION OF A VIRTUAL MACHINE

RELATED APPLICATIONS

Benefit is claimed under 35 U.S.C. 119(a)-(d) to Foreign application Serial No. 1712/CHE/2009 entitled "Apparatus And Computer-Implemented Method For Controlling Migration Of A Virtual Machine" by Hewlett-Packard Development Company, L.P., filed on 20 Jul. 2009, which is herein incorporated in its entirety by reference for all purposes.

BACKGROUND

It is now common practice in data processing infrastructures to virtualize computing resources. Virtualization software products typically operate by executing a host operating system on a server platform. A virtualization software layer creates software constructs corresponding to hardware components. For example, virtual processors, virtual network interface cards, and virtual storage resources may be instantiated by the virtualization software layer. The number of virtual resources may exceed the physical resources available on the server platform. For example, the number of virtual processors may exceed the number of physical processors.

The virtual resources are assigned to virtual machines. The virtual machines are used to execute guest operating systems as respective processes on top of the host operating system. The guest operating systems, in turn, may be used to execute one or several applications or to execute further virtualization layers.

The creation and operation of virtual machines in this manner provides a number of advantages. Specifically, by executing applications in respective virtual machines instead of physical servers, the utilization rate can be much higher. Moreover, administrative and maintenance costs associated with server platforms can be reduced and greater flexibility is afforded in managing fluctuating workloads.

Examples of virtualization products for the Intel 32-bit computing architecture are the VMware ESX server product and the Xen hypervisor product.

Recently, standard formats have been developed for portable virtual machines giving the platform a portable package containing all the required installation and configuration parameters for the virtual machines. Virtual machines packaged using the standard format may be readily migrated around a widely distributed heterogeneous set of hosts.

BRIEF DESCRIPTION OF THE DRAWINGS

Embodiments of the invention will now be described by way of example only by reference to the accompanying drawings, in which.

DETAILED DESCRIPTION OF THE EMBODIMENTS

The present disclosure concerns a computer-implemented method of controlling migration of a virtual machine from a source host to a destination host. A graph data structure is employed wherein one or more hosts are associated with at least some of the nodes of the graph data structure, a source node being associated with the source host and a destination node being associated with the destination host, and in which each link of the graph data structure is ascribed at least a permission value associated with the virtual machine. Within the graph structure it is determined if traversal of a path from the source node to the destination node is permitted by the permission values of the links in the path. Migration of the virtual machine is allowed if traversal from said source node to said destination node along the path is permitted.

The graph may be a tree and the permission value may take a first value allowing traversal along a path including the node or a second value not permitting traversal along a path including the node. The permission value may be defined for each path direction and for each virtual machine at least for each link in the graph. A matrix may be maintained at each of a plurality of hosts comprising source nodes, destination nodes and permission values.

Apparatus and computer program products for controlling migration of a virtual machine from a source host to a destination host are also described. The computer program products may take the forms of cluster management software for installation on virtual or physical nodes of a computer cluster.

Figure 1:
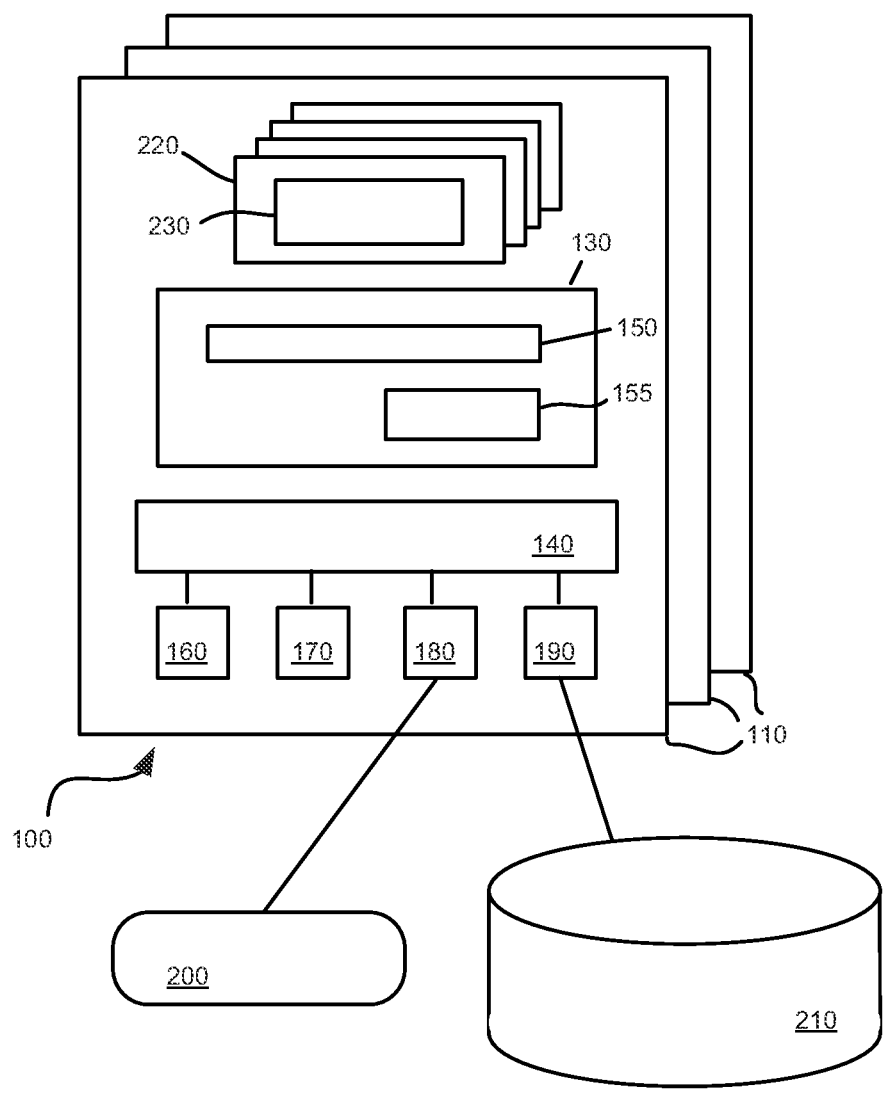
FIG. 1 is a schematic view of a data processing system according to one representative embodiment.

Referring now to the drawings, FIG. 1 is a schematic view of a data processing system 100 according to one representative embodiment. System 100 includes multiple server platforms 110. Any number of server platforms may be employed. Each server platform 110 includes host operating system 130 that runs on a hardware layer 140 of the platform. In one embodiment, host operating system 130 includes virtualization layer 150 and clustering software 155. Virtualization layer 150 creates software constructs that correspond to the physical resources of hardware layer 140 of platform 110. The hardware layer 140 of each server platform may include any number of physical resources such as one or more CPU(s) 160, memory 170, network interface 180 to access network 200, input/output (I/O) interface 190 to access storage 210 or the like.

Virtual resources are assigned in each server platform to a set of virtual machines 220. The number of virtual CPUs may exceed the number of physical CPUs 160. Host operating system 130 may schedule the execution of the processes associated with virtual machines 220 on physical CPUs 160 in accordance with the assigned virtual CPUs.

Each virtual machine 220 is executed as a process on top of operating system 130 in accordance with its assigned virtual resources. CPU virtualization may occur in such a manner to cause each virtual machine 220 to appear to run on its own CPU or set of CPUs. The CPU virtualization may be implemented by providing a set of registers, translation lookaside buffers, and other control structures for each virtual CPU. Accordingly, each virtual machine 220 is isolated from other virtual machines 220. Additionally, each virtual machine 220 is used to execute a respective guest operating system 230. The virtual resources assigned to the virtual machine 220 appear to the guest operating system 230 as the hardware resources of a physical server. Guest operating system 230 may, in turn, be used to execute one or several applications, clustering software or to act as a virtualised host using further virtualisation layers (not shown).

Figure 2:
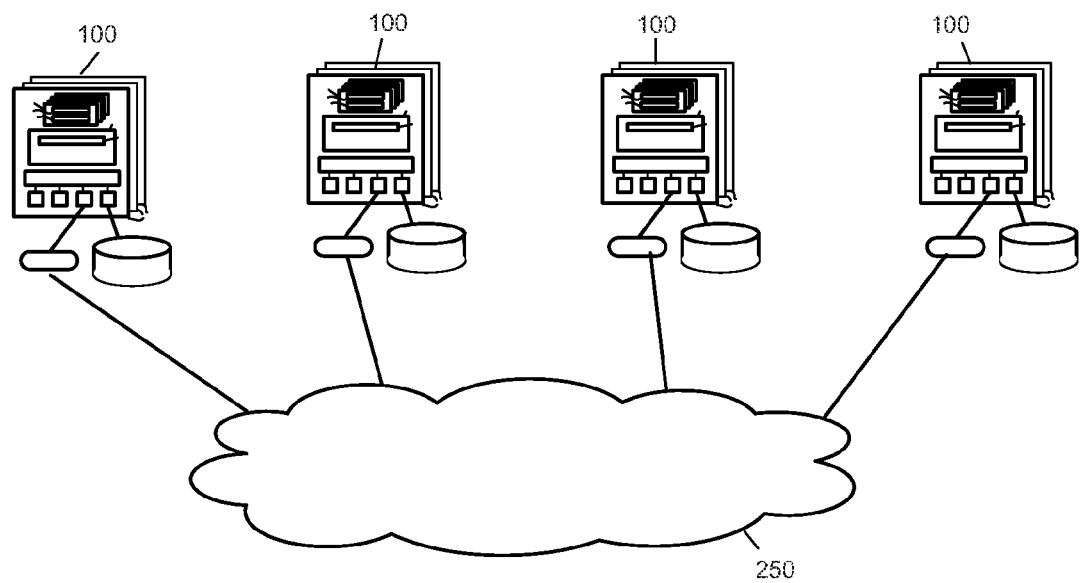
FIG. 2 shows a number of systems such as that illustrated in FIG. 1 interconnected by a network according to one representative embodiment.

Cluster management software 155 enables multiple independent physical or virtual systems to be operated and managed as a single system. Cluster management software 155 may form a cluster, add members to a cluster, and remove members from a cluster. Cluster management software may also present a comprehensive view of the resources of the entire cluster to a management application. FIG. 2 shows a number of systems 100 such as that illustrated in FIG. 1 interconnected by a network 250, which may be a wide area network and the systems 100 may be geographically separated by long distances.

The systems such as those illustrated in FIGS. 1 and 2 may, for example, be used to form a virtualized Highly Available (VHA) computer system consisting of multiple virtualized hosts running virtual machines as packaged services which may adhere, for instance, to the Open Virtual Machine Format defined by DTMF. Such a VHA system may consists of homogeneous nodes in each of which all Virtual Hosts (VH) may be either Xen DOMO hosts or VMware ESX hosts, for instance. VHA systems comprising Xen Hosts and VHA systems comprising VMware Hosts may be integrated to form a cluster of heterogeneous systems. Within such a system a packaged virtual machine conforming to OVF may make inter-cluster hops and intra-cluster hops.

A security framework will now be described for supporting authentication during migration of virtual machines from one host to another host within such a system.

A set of domains is defined in which each host, whether it is running on a virtual or a physical machine, is associated with a domain. The domains are arranged as nodes in a graph structure, which may be a tree hierarchy for instance. Each host in the system from which and to which migration is controlled (whether virtual or physical) may be associated with a domain and thus with a node in the graph, but it is not necessarily the case that each domain is associated with a host. Domains may be defined that are not hosts, but that represent other trust boundaries existing in the system.

For every virtual machine in the system a transition matrix is maintained to embody permission values for the virtual machines. The transition matrix serves as a reference structure for calculating whether a given virtual machine may be allowed to migrate within the system. The transition matrices may be unique for each virtual machine instance, but that is not necessarily the case. For instance in some embodiments, there may be transition matrices associated with sets or classes of virtual machines. Many arrangements are possible.

In one embodiment, a copy of the transition matrix for each virtual machine in the system is maintained at each host by the cluster software 155. However, other arrangements are possible. For example, a single copy of the transition matrix could be maintained by a centrally accessible server. The transition matrix is used to decide on the permissions available to a virtual machine located in a domain sd, requesting migration to a destination domain dd. The transition matrix is flexible and can be expanded to include additional security tags without changing the basic structure.

Migration rights for virtual machines are established using a graph traversal algorithm that has the source domain (sd), destination domain (dd) and an identification of the virtual machine (vm) as its basic units.

The transition matrix may be constructed using any suitable data structure and may be a container matrix that is dynamically and sparsely populated according to the knowledge that each particular node has. The coordinate tuple $\{sd_i, dd_j, vm_k\}$ may have a value $T_{ijk}$ depending on a transition function. That is, each of the set T of resolved tuples $\{sd_i, dd_j, vm_k\}$ that constitute the transition matrix resolves to a value defined by the transition function. That is, each resolved tuple carries a permission value for a virtual machine located in a domain sd, requesting transition to domain dd.

In this example embodiment, there are two values for the migration permissions:

$$T=\{MIGRATION\_NA, MIGRATION\_A\}$$

where MIGRATION_NA signifies "Migration NOT Allowed" and MIGRATION_A signifies "Migration Allowed".

In order to determine whether a packaged virtual machine $vm_k$ may be migrated from $Host_i$ to $Host_j$, the graph structure is traversed and if a path exists from domain i to domain j in which every hop for $vm_k$ has a T value equal to MIGRATION_A, then migration of that vm from $host_i$ to $host_j$ is permitted. If no path exists in which all hops have a value equal to MIGRATION_A, then migration of $vm_k$ from $host_i$ to $host_j$ is not permitted.

It should be noted that the transition matrix is not necessarily symmetric in that the permission values may be different according to the direction of the path and the use of such a matrix allows asymmetries in the permitted migration flows to be conveniently captured. In such systems, the fact that a migration of a virtual machine from node A to node B is allowed does not necessarily mean that migration of the same virtual machine from node B to node A is also allowed.

It will be understood that the domain structure and transition matrix may be used by the migration cluster management protocols implemented within the system in many different ways to establish migration permissions. In one embodiment for example, cluster software 155 in $host_i$ may send, using a suitable cluster protocol, a request to $host_j$ to transfer $vm_k$ to $host_j$. In response, $host_j$ may perform the path calculation on a local copy of the graph and provide a response to $host_i$ permitting or not permitting the migration.

Figure 3:
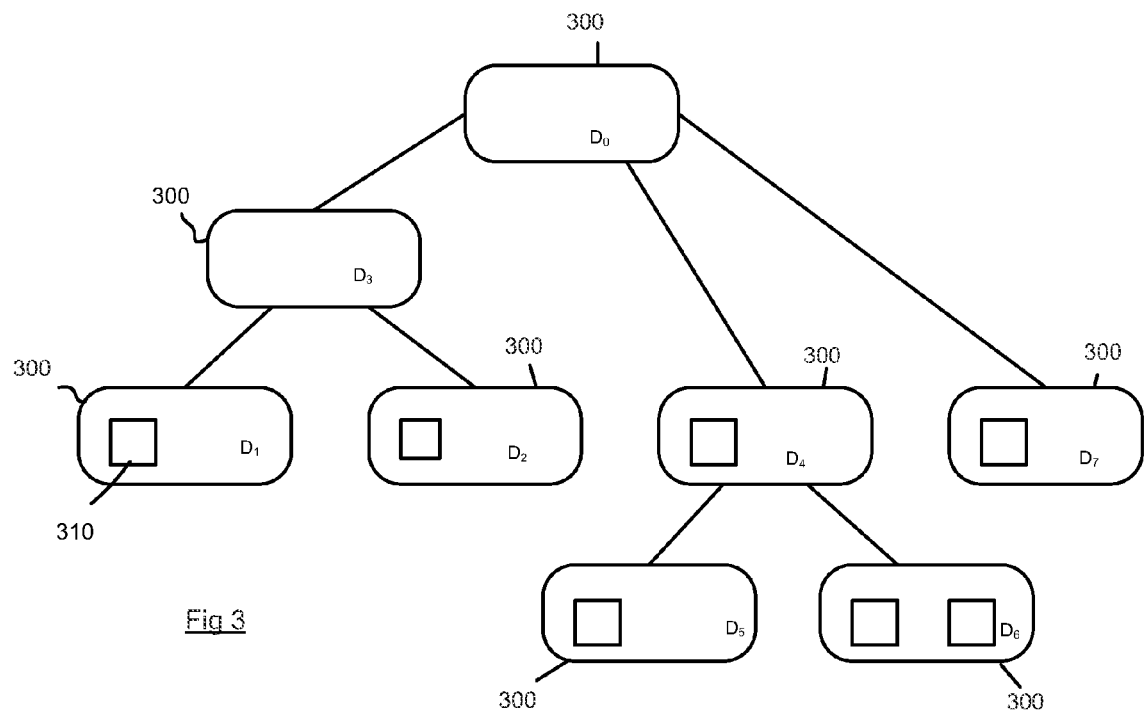
FIG. 3 illustrates an example graph structure according to one representative embodiment.

FIG. 3 illustrates an example graph structure of 8 nodes 300 representing 8 domains $D_i$ where i ranges from 0 to 7. In this example, the graph is a tree. It will be appreciated that FIG. 3 represents a very simple example with a small number of nodes. The techniques described here may be implemented with any number of nodes and are designed to be scalable to very large numbers of nodes. By convention in these examples D0 is used for a root domain.

The tree structure of FIG. 3 can be represented by the set of links:

$$L=\{(D_3,D_1),(D_3,D_2),(D_0,D_3),(D_0,D_4),(D_4,D_5),(D_4,D_6),(D_0,D_7)\}$$

The transition matrix takes the form:

$$T_{ijk}=\{D_i,D_j,vm_k\}$$

As an example if a vm 310 was to be migrated from $D_1$ to $D_5$ the graph would be traversed to determine the values $\{T_{13}, T_{30}, T_{04}, T_{45}\}$ for that vm which lie on the path in the tree from D1 to D5. If any of these values in this path is MIGRATION_NA, then migration of vm 310 from D1 to D5 will not be allowed. By inference in this case the value $T_{15}$ will also be set to MIGRATION_NA. If all values are MIGRATION_A then migration will be allowed. By inference in this case the value $T_{15}$ will also be set to MIGRATION_A.

Figure 4:
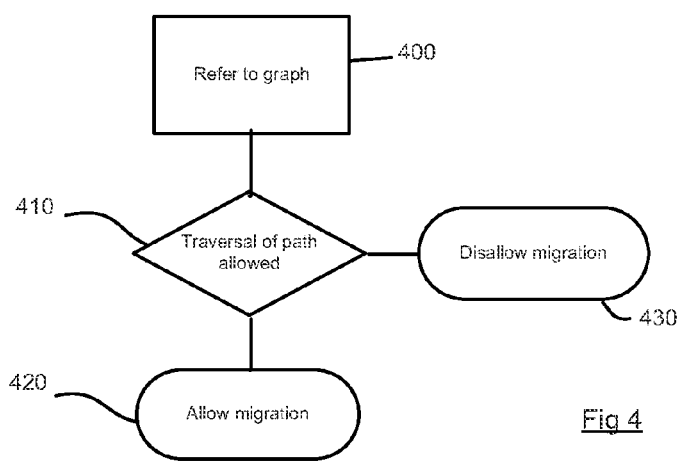
FIG. 4 is a flow diagram illustrating a computer-implemented method of controlling migration of a virtual machine according to one representative embodiment.

FIG. 4 illustrates a computer-implemented method of controlling migration of a virtual machine from a source host to a destination host. In step 400, a graph data structure is referred to determine if traversal of a path from the source node to the destination node is permitted by the permission values of the links in the path. A decision is taken in step 410 allowing migration of said virtual machine—step 420—if traversal from said source node to said destination node along the path is permitted and not allowing migration step —430— if traversal from said source node to said destination node along the path is not permitted.

It should be noted that, once transition matrix has been populated, the permission values T may be relatively static, though they may be changed from time to time according to well-defined criteria. The decision values T may also be audited as a part of the organization's security policy. Suitable policies, protocols and tools may be defined to update the graph structure and transition matrix to reflect changes in the system.

For example, a new host may be added to the graph by appending a new node to an existing node in the graph and adding a new link ($D_{existing}$, $D_{new}$) to the graph. The existence of the link may for instance be broadcast or multicast using a suitable protocol to the cluster software from an administrative console so that the cluster software may update their local copies of the graph. The value of the transition matrix T for transitions crossing the new link may also be broadcast for each existing virtual machine $vm_k$.

When a new virtual machine $vm_{new}$ is created at a node, any values of T that are known because of existing trust relationships can be communicated to other members of the cluster. For instance, if vm 310 were to be newly created and it was known at host $D_1$, that migration to domain $D_5$ was trusted, then $T_{15}$ should be set to MIGRATION_A. Each host receiving this information may then set each of $T_{13}$, $T3_0$, $T_{04}$, $T_{45}$ which lie on the path from $D_1$ to $D_5$ to MIGRATION_A for $vm_{new}$. In this way, the transition matrix for the new vm may be dynamically populated.

Instructions of software described above are loaded for execution on a processor (such as one or more CPUs 160 in FIG. 1). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture), that is a computer program product. An article or article of manufacture can refer to any manufactured single component or multiple components.

Any or all of the tasks described above may be provided in the context of information technology (IT) services offered by one organization to another organization. The IT services may be offered as part of an IT services contract, for example.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A computer-implemented method for controlling a migration of a virtual machine from a source host to a destination host, comprising:
   referring to a graph data structure wherein one or more hosts are associated with at least some of the nodes of the graph data structure, a source node being associated with the source host and a destination node being associated with the destination host, and in which each link of the graph data structure is ascribed at least a permission value associated with the virtual machine, to determine when traversal of a path from the source node to the destination node is permitted by the permission values of the links in the path, wherein the permission value is defined for each path direction; and
   allowing the migration of said virtual machine when traversal from said source node to said destination node along the path is permitted.

2. A computer-implemented method as claimed in claim 1 wherein the graph is a tree.

3. A computer-implemented method as claimed in claim 1 wherein the permission value can take a first value allowing traversal along a path including the node or a second value not permitting traversal along a path including the node.

4. A computer-implemented method as claimed in claim 1 wherein a permission value is defined for each virtual machine at least for each link in the graph.

5. A computer-implemented method as claimed in claim 1 comprising maintaining a matrix comprising source nodes, destination nodes and permission values.

6. A computer-implemented method as claimed in claim 5 wherein the matrix is maintained at each of a plurality of hosts.

7. An apparatus for controlling a migration of a virtual machine from a source host to a destination host, comprising:
   a graph data structure wherein one or more hosts are associated with at least some of the nodes of the graph data structure, a source node being associated with the source host and a destination node being associated with the destination host, and in which each link of the graph data structure is ascribed at least a permission value associated with the virtual machine, wherein a permission value is defined for each path direction;
   program code elements, executed by a CPU, for determining when traversal of a path from the source node to the destination node is permitted by the permission values of the links in the path; and
   program code elements, executed by the CPU, for signalling that the migration of said virtual machine is allowed when traversal from said source node to said destination node along the path is permitted.

8. An apparatus as claimed in claim 7 wherein the graph is a tree.

9. An apparatus as claimed in claim 7 wherein the permission value can take a first value allowing traversal along a path including the node or a second value not permitting traversal along a path including the node.

10. An apparatus as claimed in claim 7 wherein a permission value is defined for each virtual machine at least for each link in the graph.

11. An apparatus as claimed in claim 7 comprising a stored representation of a matrix comprising source nodes, destination nodes and permission values.

12. A non-transitory computer readable medium containing thereon a computer program product for controlling a migration of a virtual machine from a source host to a destination host, comprising program code elements for:
- maintaining a graph data structure wherein one or more hosts are associated with at least some of the nodes of the graph data structure, a source node being associated with the source host and a destination node being associated with the destination host, and in which each link of the graph data structure is ascribed at least a permission value associated with the virtual machine, wherein the permission value is defined for each path direction;
- referring to the graph structure to determine when traversal of a path from the source node to the destination node is permitted by the permission values of the links in the path; and
- signalling that the migration of said virtual machine is allowed when traversal from said source node to said destination node along the path is permitted.

13. A non-transitory computer readable medium containing thereon a computer program product as claimed in claim 12 in the form of cluster management software for installation on nodes of a computer cluster.

* * * * *